Sept. 3, 1957 W. F. BRAUER 2,805,310
INDUCTION HEATING APPARATUS
Filed Feb. 23, 1954 2 Sheets-Sheet 1
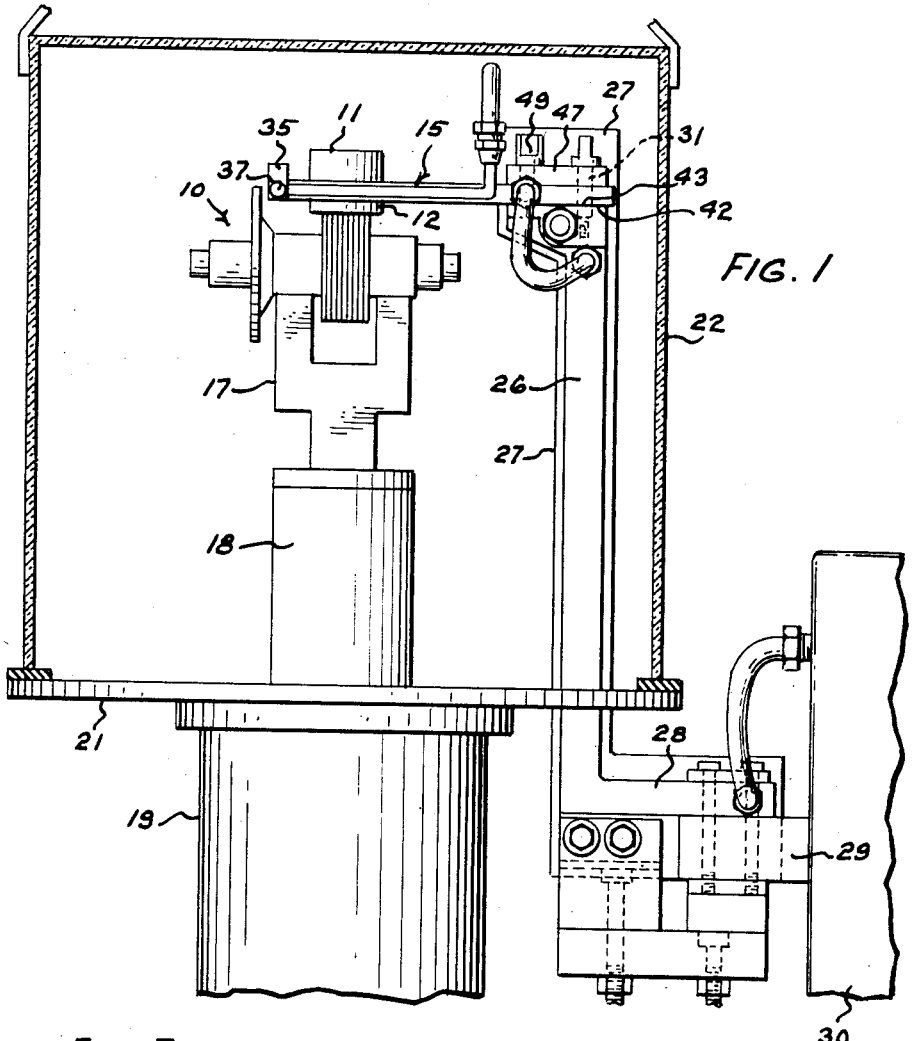
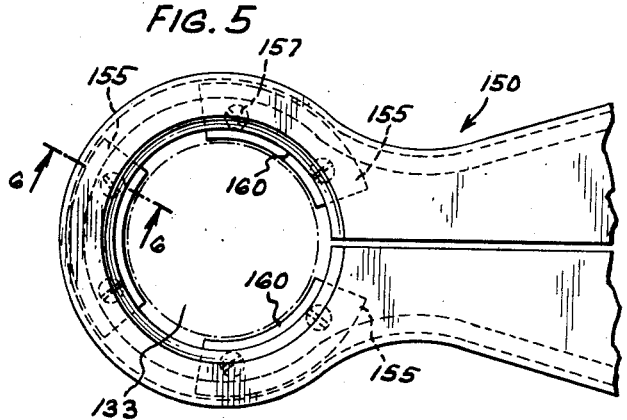
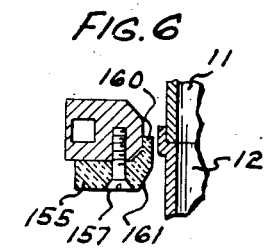
INVENTOR
W. F. BRAUER
BY C. B. Hamilton
ATTORNEY Sept. 3, 1957 W. F. BRAUER 2,805,310
INDUCTION HEATING APPARATUS
Filed Feb. 23, 1954 2 Sheets-Sheet 2
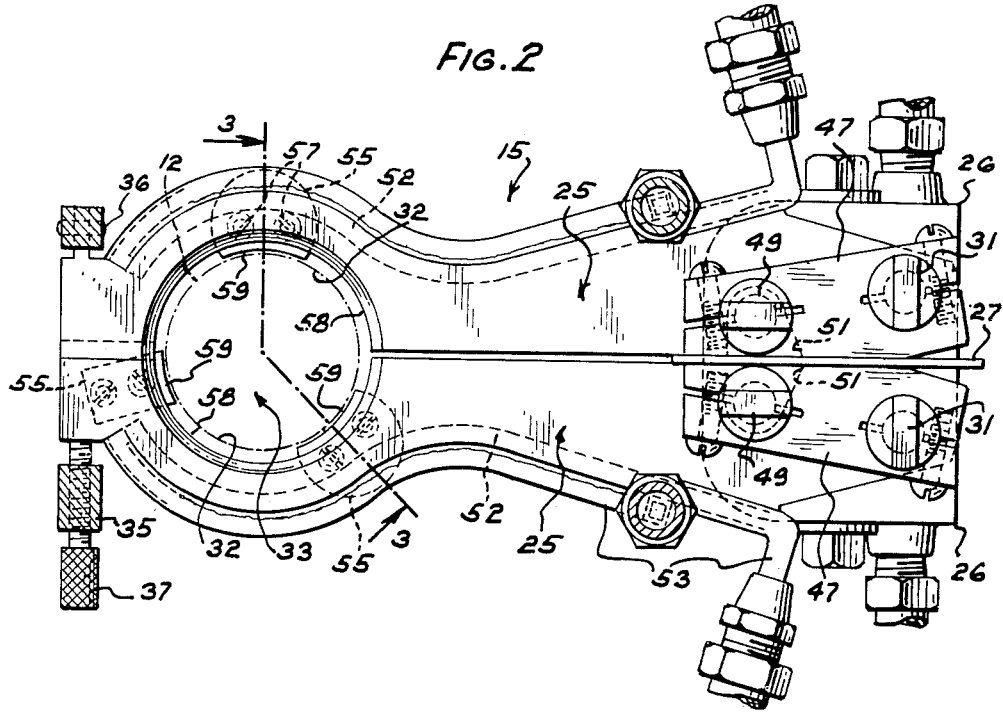
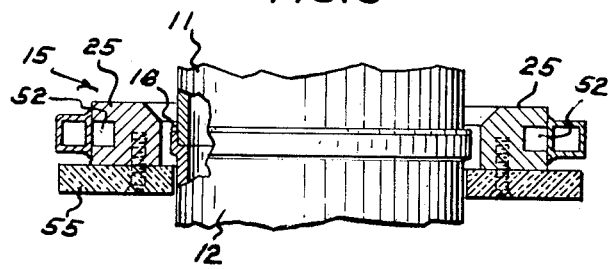
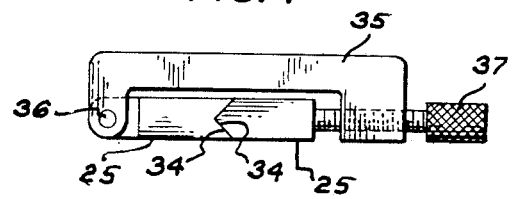
INVENTOR
W. F. BRAUER
BY C. B. Hamilton
ATTORNEY United States Patent Office 2,805,310
Patented Sept. 3, 1957

2,805,310

INDUCTION HEATING APPARATUS

William F. Brauer, Chicago, Ill., assignor to Western Electric Company, Incorporated, New York, N. Y., a corporation of New York Application February 23, 1954, Serial No. 411,963

2 Claims. (Cl. 219—10.79)

This invention relates to an induction heating apparatus and more particularly to an induction heating coil having insulating means engageable with the part being heated to align the part with the coil.

An object of the invention is to provide an induction heating apparatus having an inductor with means thereon for aligning a part to be heated with the inductor.

A further object of the invention is to provide an induction heating coil having insulating members thereon for positioning the part to be heated in alignment with the coil and to provide equal spacing at all points between the coil and the part.

An induction heating apparatus illustrating certain features of the invention may include an inductor having ends connected to a source of high frequency current and having an opening for receiving an article to be heated. Heat and electrical insulating means mounted on the inductor project into the opening therein and serve to engage and concentrically align the part being heated in the inductor opening.

Other objects and advantages of the invention will become apparent by reference to the following detailed description of the invention and the accompanying drawings illustrating a preferred embodiment thereof, in which:

Fig. 1 is a vertical sectional view of a portion of an induction heating apparatus showing the improved coil structure therein;

Fig. 2 is a plan view of a portion of the apparatus showing one embodiment of the improved coil structure with parts shown in section;

Fig. 3 is an enlarged vertical sectional view through the coil taken on the line 3—3 of Fig. 2;

Fig. 4 is an end view of the coil showing the clamp for holding the coil sections together;

Fig. 5 is a plan view of a modified embodiment of the coil structure; and

Fig. 6 is a vertical cross-sectional view taken along the lines 6—6 of Fig. 5.

The present apparatus is designed to heat electronic tubes 10 of the magnetron type to effect the brazing of a component 11 to a component 12 thereof. The juncture of the components 11 and 12 is positioned within an induction heating coil 15 and has a ring of brazing material 16 adjacent thereto to effect the bonding of the components during the brazing operation. The tube 10 is supported on the upper surfaces of a U-shaped holder 17 for limited horizontal movement. The holder 17 is mounted on the upper end of a piston 18, which is movable within a stationary cylinder 19 of a hydraulic actuator for raising the holder 17 from a lower position for loading and unloading the tube 10 therein to an upper position as shown in Fig. 1 for supporting the tube in operative position within the coil 15. An annular table 21 which is supported on the upper end of the stationary cylinder 19 is adapted to cooperate with a vertically movable cylindrical glass housing 22 to form a chamber enclosing the coil 15 and the tube 10 and into which chamber an inert or reducing gas may be flowed prior to the brazing operation. The housing 22 has means connected at its upper end for raising and lowering it.

The coil 15 in the embodiment of the invention shown in Figs. 1-4 is made in two sections 25, 25 which are pivotally mounted at one end and are disposed in their open position during the movement of the magnetron 10 to its upper or brazing position, after which the coil sections are moved to their closed position preparatory to the brazing operation.

The coil sections 25 (Fig. 2) are supported on the upper ends of a pair of vertically disposed metal connector members or standards 26 insulated from each other by a strip of insulation 27 and having lugs 28 at their lower ends connected to terminals 29 of a high frequency current generating device 30. The coil sections 25 are pivotally mounted at their rear ends for oscillatable movement about the shanks of screws 31 to and from an open position (not shown) and a closed position shown in Fig. 2. The coil sections 25 are in the form of elongated flat plates of irregular shape having semi-circular recesses 32 adjacent the forward ends thereof which recesses cooperate to form a circular opening 33 for receiving portions of the components 11 and 12 of the magnetron tube 10 therein. The forward end portions of the coil sections 25 have V-shaped conforming surfaces 34—34 adapted to engage each other in closed position, and the ends of the coil sections are adapted to be releasably held in tight engagement with each other by a clamping member 35 pivotally connected to one of the coil sections at 36 and having a threaded clamping member 37 adjustably mounted thereon and engageable with the other coil section for clamping the forward ends of the sections together.

The coil sections 25 are spaced apart from each other except at their forward ends, and the rear portions thereof are provided with flat lower surfaces 42 which engage and are supported by the upper surfaces 43 of the connector members 26 for horizontal oscillatable movement thereon about the screws 31 which fit in cylindrical apertures in the coil sections. A pair of blocks 47 are positioned above the coil sections 25, and are adjustably secured by the screws 31 and screws 49 threaded into the upper ends of the member 26 for holding the coil sections 25 for oscillatable movement against the supporting surfaces 42 to establish electrical connections between the coil sections and the connector elements 26. Each of the coil sections 25 is provided with a clearance recess 51 for the screw 49 permitting oscillating movement of the coil sections 25 to and from their open and closed positions. Cooling passageways 52 formed in the coil elements 25 are connected to conduits 53 which are supplied with a coolant for cooling the coil during the brazing operation. Suitable passageways and conduits may also be provided in the connecting elements 26 for circulating coolant therethrough during the brazing operation. The induction heating apparatus thus far described is substantially the same as that disclosed in the patent application of T. W. Kalbow-L. O. Reichelt, Serial No. 384,812, filed October 8, 1953, now Patent #2,759,086.

Because the connector elements 26 on which the coil 15 is supported are relatively long the upper ends thereof may be displaced by the accidental application of a predetermined lateral force thereto while moving the coil sections 25 to and from their open and closed positions and thus cause the opening of the coil 15 to be shifted from its proper predetermined position in vertical alignment with the components 11 and 12 of a tube 10 on the holder 17. If the components 11 and 12 are eccentrically disposed within the coil 15, portions of the coil may become burned during the brazing operation. Thus, in order to insure proper alignment of the components 11 and 12 of the tube 10 within the opening of the coil, means are provided on the coil for aligning the coil and the tube relative to each other.

The means for aligning the tube 10 and the coil 15 relative to each other comprises a plurality of positioning elements 55 which are made from heat and electrical insulating material, such as natural steatite, capable of withstanding high temperatures. The elements 55 are in the form of flat discs or blocks secured to the lower face of the coil by a plurality of screws 57 engaging threaded apertures 58 in the coil sections 25. Portions of the elements 55 extend a predetermined distance inwardly from the inner annular surface 58 of the coil sections and have arcuate surfaces 59 which are disposed in concentric relation with the circular opening 33 and are arranged at spaced points angularly about the axis of the aperture and serve to concentrically align the components 11 and 12 with the cylindrical surfaces 58 and to prevent movement of the components 11 and 12 of the magnetron tube laterally into engagement with the coil 15. With the tube 10 in brazing position the elements 55 are positioned below the juncture of the components 11 and 12, and the inner surfaces 59 of the elements 55 are normally spaced from the outer periphery of the component 12 a small distance sufficient to permit the component 12 to expand slightly during the brazing operation.

In the form of construction shown in Figs. 5 and 6, the induction heating coil 150 is made as a single continuous coil section with the ends thereof adapted to be clamped between blocks 47 and the upper surface of the connector elements 26 and having a circular opening 133. A plurality of arcuate insulating spacing elements 155 are secured to the underneath side of the coil 150 by a plurality of screws 157. The spacing elements 155 have upwardly extending arcuate flange portions 160 adapted to engage the inner surfaces of the opening 133 in the coil 115, and serve as spacers between the coil 115 and the components 11 and 12 of the magnetron tube 10. Conical or sloping guide surfaces 161 are formed on the lower inner portion of the spacing elements 155 for engaging the component 11 of a slightly misaligned magnetron tube as it is being elevated for guiding it into the opening 133 of the coil and in proper alignment therewith.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. An induction heating apparatus comprising an inductor having an end face and an aperture extending therethrough transversely of said end face for receiving an article therein in a direction parallel to said aperture, and a plurality of elements of dielectric material secured to the inductor, each of said dielectric elements having a portion engaging said end face and having a spacer portion extending in the said direction into the aperture in the inductor for engaging the article and positioning it within the aperture in a predetermined spaced relation to the inductor, said dielectric elements having sloping surfaces for directing the article laterally into the aperture in the inductor and into engagement with the spacer portions of the elements.

2. In an induction heating apparatus, a one piece inductor having an end face and a cylindrical aperture extending therethrough transversely of said face and provided with a cylindrical inner surface for receiving therein in an axial direction an article to be heated, a plurality of elements of dielectric material on the inductor, each of said dielectric elements having a radially directed portion mounted on said end face and having a cylindrical spacer portion extending from said radially directed portion in an axial direction within said aperture in engagement with said inner surface and of a predetermined thickness for positioning the article in a predetermined spaced relation to said inner surface of the inductor, said dielectric elements having sloping surfaces for guiding the article transversely of said axial direction into said aperture in the inductor and into engagement with the spacer portions of said elements, and means for removably securing the elements to the end face of the inductor.

References Cited in the file of this patent

UNITED STATES PATENTS

| | | |
|---|---|---|
| 2,293,049 | Denneen et al. | Aug. 18, 1942 |
| 2,343,889 | Denneen et al. | Mar. 14, 1944 |
| 2,419,619 | Wood | Apr. 29, 1947 |
| 2,481,008 | Gagliardi | Sept. 6, 1949 |
| 2,574,564 | Hogel et al. | Nov. 13, 1951 |
| 2,665,367 | Seulen | Jan. 5, 1954 |